Feb. 4, 1964

J. D. ALLEN ETAL 3,120,243

FLOW REGULATING VALVE WITH EXTENDED MOVEMENT

Filed Feb. 5, 1962

INVENTORS
JOHN D. ALLEN
RAY G. HOLT by Charles F. Vosteen
Atty.

United States Patent Office 3,120,243
Patented Feb. 4, 1964

3,120,243
FLOW REGULATING VALVE WITH EXTENDED MOVEMENT
John D. Allen, South Euclid, and Ray G. Holt, Westlake, Ohio, assignors to Fawick Corporation, Cleveland, Ohio, a corporation of Michigan
Filed Feb. 5, 1962, Ser. No. 171,025
3 Claims. (Cl. 137—504)

This invention relates to pressure responsive valves.

Pressure responsive valves are used in a large number of applications among which are shut-off valves to stop flow of fluid under pressure into a given stream, and to regulate the quantity of fluid under pressure which is allowed to flow into such stream in a given time. In all such cases a pressure responsive valve element is inserted into the stream and then is made to constrict or shut off, as a function of the pressure of the fluid in the stream, a passageway through which the stream flows.

Whether a valve element merely constricts a stream or shuts it off completely, the movement of the valve at or near the shut-off point is critical. Thus, it has been found that shut-off valves operated automatically by fluid pressure frequently chatter at the shut-off point, and that pressure responsive flow-regulating valves become erratic at high pressures, i.e., at the point where the constriction is the greatest.

It is an object of this invention to provide a pressure responsive valve for controlling the flow of the fluid under pressure to which said valve is responsive, wherein the valve will constrict or cut off flow of said fluid smoothly and in a predetermined manner.

We have found that chatter and erratic operation of a valve at high pressures are the result of an excessively rapid cut-off of the flow, i.e., the cut-off or constriction of a stream takes place during an exceedingly small movement of the pressure responsive valve element, and it is accordingly another object of this invention to provide a pressure responsive valve for constricting or cutting off a stream wherein the last stages of operation of the valve element are extended over a greater distance of travel of the valve element.

A specific object of this invention is the provision of a pressure regulating valve which is adapted to permit free flow of fluid therethrough in one direction, but which will decrease the rate of flow therethrough in the opposite direction in accordance with pressure, the flow at high pressures being steady and the variation with pressure being smooth.

These and other objects of this invention will become apparent from the following detailed description of a preferred embodiment of the invention, when taken together with the accompanying drawings in which.

Figure 1:
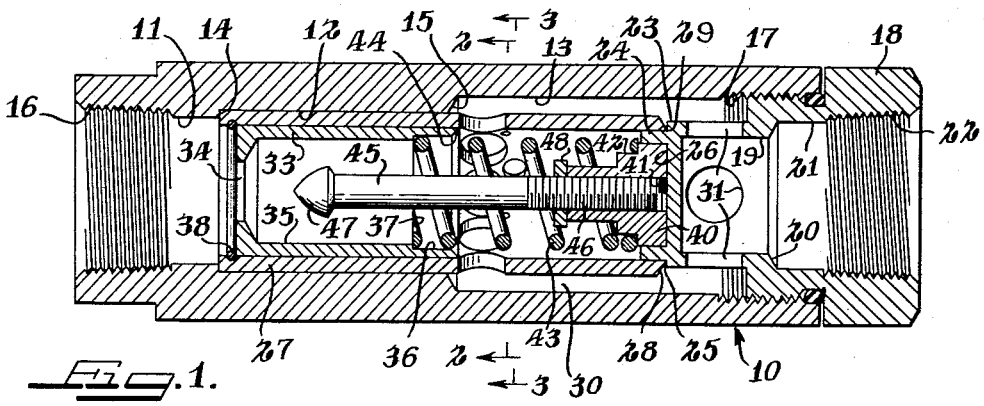
FIGURE 1 is a longitudinal section through a valve incorporating this invention.

The valve chosen to illustrate this invention is a flow regulating valve, such as may be used in a hydraulically operated fork lift truck. It is designed to be installed in one of the lines between the control valve for the fork lift and the cylinder which operates said fork lift. It is so constructed that it does not add an appreciable restriction to the flow of fluid into the cylinder when the latter is performing work, but it limits the flow out of the cylinder when the load is being lowered, to a predetermined maximum rate of flow regardless of the position in which the operator may place the control valve.

Referring now to the drawings for a detailed description of the invention, the valve is comprised of a body 10, which may have a cylindrical exterior contour, said body having a bore 11 and counterbores 12 and 13 connected by shoulders 14 and 15 respectively. Bore 11 is threaded at 16 to receive an appropriate pipe fitting (not shown), and counterbore 13 is threaded at 17 to receive a fitting 18. Said fitting 18 has a recess 19 therein connected by a shoulder 20 to a counterbore 21, the latter being threaded at 22 to receive a pipe or pipe fitting (not shown), as the case may be.

Recess 19 of fitting 18 is formed in a cylindrical extension 23 on said fitting 18, and extension 23 has, in turn, an axially extending flange 24 thereon of reduced diameter relative to the diameter of cylindrical extension 23, which forms a shoulder 25 therewith. Said flange 24 also forms a central recess 26 facing in the opposite direction from recess 19.

Within counterbore 12 and fitted therein is a sleeve 27 which abuts at one end against shoulder 14 and at its other end against shoulder 25 on fitting 18. To assure a fluid-tight fit between sleeve 27 and fitting 18, the end 28 of sleeve 27 is beveled to provide a sharp edge 29 which is pressed into shoulder 25 when fitting 18 is tightened upon threads 17.

It may be observed that sleeve 27 has an outside diameter which is smaller than the inside diameter of counterbore 13, so that a space or chamber 30 is formed between counterbore 13 and the exterior of sleeve 27. It may also be observed that the external diameter of cylindrical extension 23 on fitting 18 is smaller than the internal diameter of counterbore 13, and that chamber 30 therefore extends over the extension 23 as well as over the right-hand end of sleeve 27 as viewed in FIGURE 1.

Communication is established between chamber 30 and recess 19 by a series of drilled openings 31, and similarly, communication is established between the interior of sleeve 27 and chamber 30 by a series of drilled openings 32 (FIG. 4) in said sleeve 27.

Within sleeve 27 and axially reciprocable therein is a valve element 33, which has a fluid-tight fit with respect to sleeve 27 but is nevertheless free to slide relative thereto. Said valve element 33 has a substantially sharp-edged orifice 34 formed in one end thereof communicating with a recess 35 in said valve element and extending almost the entire length thereof, and a counterbore 36 formed at the right-hand end of recess 35, as viewed in FIGURE 1, and forming a shoulder 37 with said recess. A snap ring 38 disposed in a groove 39 (FIGURE 4) serves to limit movement of valve element 33 in sleeve 27 toward the left thereof, as viewed in FIGURE 1.

Within recess 26 is disposed a plug 40 which is formed with a central threaded opening 41. A step 42 on plug 40 serves to center and retain one end of a helical spring 43, the opposite end of which abuts upon shoulder 37 on valve element 33. Inasmuch as plug 40 is disposed in recess 26 in the axially fixed fitting 18, spring 43 serves to urge valve element 33 continuously toward the left in sleeve 27, as viewed in FIGURE 1.

Valve element 33 is of such length that when its lefthand end, as viewed in FIGURE 1, bears against snap ring 38, its righthand end 44 is approximately tangent to all of the drilled openings 32 in sleeve 27, and said openings are thus uncovered in their entirety. Accordingly, with the valve element in the position shown in FIGURE 1, fluid may readily flow from recess 19 through openings 31 into chamber 30 and around sleeve 27 to the interior thereof through openings 32. From the interior of sleeve 27, fluid then passes into recess 35 in valve element 33 and through orifice 34 into bore 11 to provide substantially free flow of fluid from recess 19 to bore 11. Said free flow in the direction indicated will not be materially restricted, so that said valve may be inserted in this manner in a line connecting a control valve to a work cylinder at 16 to supply fluid under pressure to the work cylinder for moving a load.

When the work cylinder is to be drained to lower or release a load, then the flow through the valve is reversed and it is desired in the reversed flow to control the rate of flow so that it decreases with increasing increments of pressure. In other words, it is desirable to control the flow in a reverse direction in such manner that the higher the pressure the slower the flow. This type of operation is very useful in lowering a heavy load in that the greater the load the more slowly it is lowered. This desirable result is achieved in the valve illustrated herein, as follows:

Valve element 33 is rendered pressure responsive by the pressure drop produced across substantially sharp-edged orifice 34 when the flow is from left to right, as viewed in FIGURE 1. This pressure differential increases with increasing flow, causing the valve element 33 to move to the right, as viewed in FIGURE 1, thereby causing its edge 44 to cover progressively greater portions of the drilled openings 32. The more the openings are covered, the greater the restriction in the flow through the openings, and hence the desired rate of flow through the valve is achieved. The movement of the valve across the openings 32 will be resisted by spring 43. The pressure drop across orifice 34, however, counteracted by spring 43, will produce a fixed rate of flow through the valve, since valve element 33, when subjected to a greater pressure differential created by a heavy load tending to increase the rate of flow through the valve, would move further to the right to increase the restriction of flow through the holes 32. The opposite effect would be created upon any occurrence of a reduction in flow, allowing the valve element to be moved to the left, as viewed in FIGURE 1, by spring 43 to reduce the restriction to flow.

The desired reduction in the flow, with increase of pressure drop across the orifice, is effected by the use of a modulating pin 45 which has a threaded end 46 received in the threaded opening 41 in plug 40, and which has a head 47 at its other end disposed in the path of movement of the fluid issuing from orifice 34. The position of head 47 relative to orifice 34 is adjusted by rotating pin 45 in threaded opening 41, and the selected position may be fixed by a lock nut 48 threaded on end 46 of pin 45 and abutting upon the lefthand end (FIGURE 1) of plug 40.

When modulating pin 45 is installed and set in its desired operating position, it functions effectively to reduce the size of orifice 34 when valve element 33 moves to the right (FIGURE 1) under increasing pressure differential established across the valve element by said orifice. Thus, for each increment of increasing pressure, the flow through the valve as a whole is reduced a corresponding amount. Although it is desirable to reduce the lowering speed of a load in accordance with the weight of the load, nevertheless this reduction should not be carried to such an extent as to cut off all flow entirely. For this reason, modulating pin 45 is so set relative to orifice 34 that a certain minimum flow will always be available regardless of the load, to make certain that any load lifted by the work cylinder can always be lowered to the floor and the lift truck freed for further work.

The relationship of pressure to rate of flow can be varied in two ways, either independently or simultaneously. In the first way, the shape of head 47, as presented to the flow through orifice 34, and to the orifice itself, may be such that the effective reduction in the size of the orifice produced by the head for each increment of travel of the valve element 33 can be made to vary. We have found, however, that a shape consisting in axial cross-section of two intersecting circle arcs gives the best result.

Figures 2, 3:
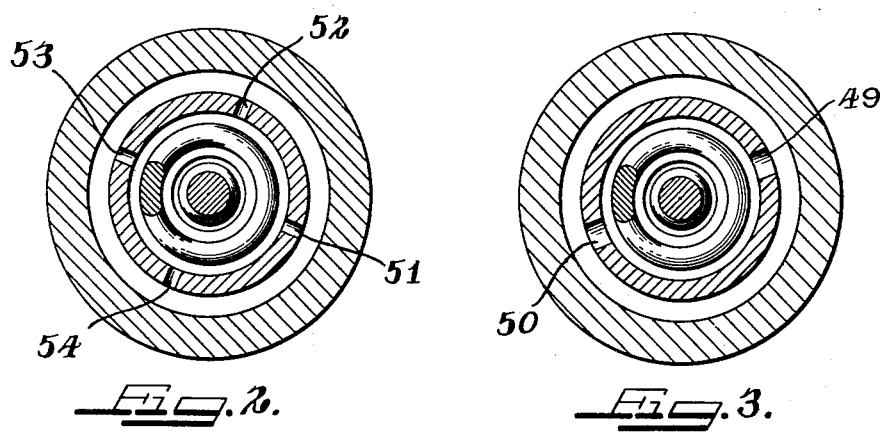
FIGURE 2 is a transverse section through the valve of FIGURE 1 taken along line 2—2 thereof.
FIGURE 3 is another transverse section through the valve of FIGURE 1 taken along line 3—3 thereof.
Figure 4:
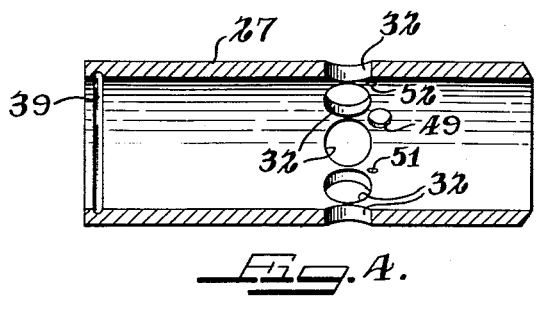
FIGURE 4 is a section through a sleeve used in the valve of FIGURE 1.

In the second way of changing the relationship of pressure to rate of flow, additional smaller openings are drilled through the sleeve 27 beyond the normal openings 32 so that in effect openings 32 are elongated. Thus, as shown in FIGURES 3 and 4, two openings 49 and 50 approximately one-half the diameter of the openings 32 may be drilled in sleeve 27 adjacent openings 32. Said openings 49, 50, however, will overlap openings 32 slightly in a radial plane (assuming that the end 44 of valve element 33 is likewise disposed in a radial plane) so that as valve element 33 moves to close or restrict openings 32, openings 49 and 50 will still be effective to allow a small flow to continue therethrough.

It is desirable that the pressure-flow curve be substantially a straight line over the operating range of the valve, and if the reduction in the area of the openings while the valve element 33 moves axially is irregular due to the shape and disposition of the openings 32, 49 and 50, additional openings may be required to produce this desirable result. Thus we have found that when the holes 49 and 50 are added to the holes 32, the pressure-flow curve over the normal range of pressures has a slight rise at the midportion thereof, which means that at certain pressures the rate of flow tends to become equal and then suddenly drops. To counteract this effect, four small holes approximately one-half the size of holes 49 and 50 were drilled in sleeve 27, as shown in FIGURES 2 and 4, said four holes 51, 52, 53 and 54 each being substantially one-half the diameter of the openings 49 or 50. Said holes 51 to 54 inclusive were drilled at an axial location corresponding to the location of the rise on the pressure-flow curve, that is, at the point on the axial travel of valve element 33 across the openings 32, 49 and 50 where the rise in the pressure-flow curve was noted. The presence of the openings 51 to 54 inclusive corrected the unevenness in the curve, and produced the desired straight line relationship over the normal range of regulation of the valve, with a gradual tapering off to the minimum flow as determined by pin 45.

The use of the openings 49 to 54 serves to extend the travel of valve element 33 while the valve element is performing its restricting function. Such lengthening of the valve element travel may be utilized in shut-off valves generally, as well as in pressure regulating valves. When used in shut-off valves which operate quickly or automatically under pressure surges, the extended valve travel serves to reduce the shock of the shutting off of the flow and thereby reduces and in many instances eliminates entirely valve chatter.

It is understood that the foregoing description is merely illustrative of a preferred embodiment of the invention, and that the scope of the invention therefore is not to be limited thereto, but is to be determined by the appended claims.

We claim:

1. A valve comprising a housing having a recess, a chamber surrounding a portion of said recess, and a passage connecting the chamber with the exterior of the housing, a hollow piston valve reciprocable in the recess and having an open end facing the bottom of the recess and an orifice in its other end, resilient means continuously urging the piston valve out of said recess, relatively fixed means in the recess in proximity to the orifice to vary the effective size of the orifice as the piston valve reciprocates relative thereto, said housing having first, second, and third series of circular holes establishing communication between the recess and chamber, said first series being arranged with their centers substantially in the same radial plane, the second series of holes being of lesser diameter than the first series and disposed in a radial plane axially spaced from the first said radial plane, said second series of circular holes being located between adjacent holes of the first series, and the third series being of lesser diameter than the second series and disposed in a radial plane located between the radial planes of the first and second series, said piston valve normally uncovering all of said holes when the pressure drop across the orifice is at a minimum, and said piston valve progressively covering the first, third, and second series of holes while simultaneously decreasing the effective size of the orifice as the pressure drop across the orifice increases, whereby to provide an extended movement of the piston valve as the effective orifice is reduced in size while maintaining a substantially constant flow through said valve.

2. A valve comprising a housing having a bore and a counterbore, a sleeve in the bore extending into the counterbore and forming a chamber with the counterbore, a plug in the counterbore in sealing relation with the sleeve and closing off one end of said sleeve, said plug having passages connecting the chamber with the exterior of the housing, a hollow axially reciprocable piston valve in the sleeve, said piston valve having an open end facing the plug, resilient means continuously urging the piston valve away from the plug, the end of said valve opposite the open end having an orifice connecting the interior of the piston valve with the interior of the sleeve at the end thereof opposite the plug, a pin fixed to the plug and extending into proximity with the orifice to vary the effective size thereof as the piston valve reciprocates in the sleeve, said sleeve having a first series of circular holes arranged with their centers substantially in the same radial plane and establishing communication between the interior of the sleeve and the counterbore, a second series of circular holes of lesser diameter disposed in a radial plane axially spaced from the first said radial plane and located between adjacent holes of the first series, and a third series of circular holes of lesser diameter than the second series disposed in a radial plane located between the radial planes of the first and second series, said piston valve normally uncovering all of said holes when the pressure drop across the orifice is at a minimum and progressively covering said first, third, and second series of holes while decreasing the effective size of the orifice as the pressure drop across the orifice increases, whereby to extend the movement of the piston valve as the orifice is reduced in size.

3. A valve as described in claim 2, said housing having inlet and outlet ends, said chamber being disposed between said inlet and outlet ends, and said first, second, and third series of holes being disposed in axially overlapping arrangement with relation to one another to produce a substantially constant flow of fluid through the valve for a large range of pressure drops across said orifice.

References Cited in the file of this patent

UNITED STATES PATENTS

| | | |
|---|---|---|
| 853,693 | Healey | May 14, 1907 |
| 2,845,086 | Waterman et al. | July 29, 1958 |
| 2,859,762 | Banker | Nov. 11, 1958 |
| 2,950,733 | Perkins | Aug. 30, 1960 |